United States Patent [19]

Isley

[11] 4,000,106
[45] Dec. 28, 1976

[54] PROCESSING AIDS FOR NITRILE RESINS
[75] Inventor: Ralph E. Isley, Northfield, Ohio
[73] Assignee: Standard Oil Company, Cleveland, Ohio
[22] Filed: Feb. 26, 1975
[21] Appl. No.: 553,091
[52] U.S. Cl. ............... 260/31.8 DR; 260/31.8 AN
[51] Int. Cl.² ..................... C08K 5/11; C08K 5/12
[58] Field of Search .......... 260/31.8 DR, 31.8 AR, 260/879, 880

[56] References Cited
UNITED STATES PATENTS

| | | | |
|---|---|---|---|
| 3,284,396 | 10/1966 | Talalay | 260/31.8 DR |
| 3,399,106 | 8/1968 | Palmer et al. | 260/31.8 DR |
| 3,426,102 | 2/1969 | Solak et al. | 260/887 |
| 3,586,737 | 6/1971 | Duke et al. | 260/879 |
| 3,725,332 | 4/1973 | Carrock | 260/31.8 DR |

*Primary Examiner*—J. Ziegler
*Attorney, Agent, or Firm*—John F. Jones; Sherman J. Kemmer

[57] ABSTRACT

Heat-stabilized, readily processable thermoplastic rubber-modified nitrile copolymer resins which have incorporated in them small amounts of a processing aid which is an alkyl ester of an organic dibasic acid.

9 Claims, No Drawings

PROCESSING AIDS FOR NITRILE RESINS

The present invention relates to an improved processable thermoplastic nitrile resin, and more particularly pertains to heat-stabilized, readily processable thermoplastic rubber-modified nitrile copolymer resins which have incorporated in them small amounts of an alkyl diester of an organic dicarboxylic acid.

Thermoplastic polymerizates of olefinic nitriles and diene rubbers of the type which are embodied in this invention are disclosed in U.S. Pat. Nos. 3,426,102 and 3,586,737.

These thermoplastic nitrile resins are prepared by polymerizing a major portion of an olefinically unsaturated nitrile, such as acrylonitrile, and a minor portion of an ester of an olefinically unsaturated carboxylic acid, such as ethyl acrylate, in the presence of a preformed rubbery polymer of a major proportion of a conjugated diene, such as butadiene, and optionally a minor proportion of at least one other monomer selected from the group consisting of an olefinically unsaturated nitrile, a vinyl aromatic monomer, and an ester of an olefinically unsaturated carboxylic acid.

The conjugated diene monomers useful in the polymers embodied in this invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene and isoprene because of their ready availability and their excellent copolymerization properties.

The olefinically unsaturated nitriles useful in the present invention are the alpha,beta-olefinically unsaturated nitriles having the structure

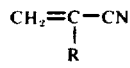

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acids useful in the present invention are preferably the lower alkyl esters of alpha,beta-olefinically unsaturated carboxylic acids, and more preferred are the esters having the structure

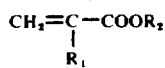

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl,alpha-chloroacrylate, ethyl,alpha-chloroacrylate, and the like. Most preferred in the present invention are methyl acrylate, ethyl acrylate, and methyl methacrylate.

The polymeric materials useful in this invention can be prepared by any of the known general techniques of polymerization including the bulk polymerization, solution polymerization, and emulsion polymerization or suspension polymerization techniques by batch, continuous or intermittent addition of the monomers and other components. The preferred method is emulsion polymerization. The polymerization is preferably carried out in aqueous medium in the presence of an emulsifier and a free-radical generating polymerization initiator at a temperature of from about 0 to 100° C in the substantial absence of molecular oxygen.

The preferred polymeric compositions embodied herein are those resulting from the polymerization of 100 parts by weight of (A) at least 50% by weight of at least one nitrile having the structure

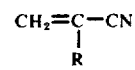

wherein R has the foregoing designation and (B) up to 50% by weight based on the combined weight of (A) and (B) of an ester having the structure

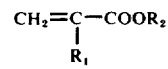

wherein $R_1$ and $R_2$ have the foregoing designations in the presence of from 1 to 40 parts by weight of (C) a polymer of at least 50% by weight of a conjugated diene monomer selected from the group consisting of butadiene and isoprene and up to 50% by weight of at least one member selected from the group consisting of styrene, an olefinically unsaturated nitrile having the structure

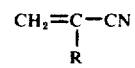

wherein R has the foregoing designation, and an ester having the structure

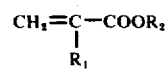

wherein $R_1$ and $R_2$ have the foregoing designations.

The alkyl esters of organic dicarboxylic acids which serve as processing aids in this invention are those having the structure $R_3$-$(COOR_4)_2$ wherein $R_3$ is a hydrocarbon diradical having from 4 to 10 carbon atoms and $R_4$ is an alkyl group or an alkenyl group having from 3 to 6 carbon atoms. Most preferred are the propyl, butyl, amyl, and hexyl phthalates, adipates, azelates, and sebacates. These processing aids are useful in the range of from about 0.05 to 2 parts by weight per 100 parts by weight of the resin in which they are incorporated.

This invention is further illustrated in the following examples wherein the various amounts of materials used are expressed in parts by weight unless otherwise specified.

EXAMPLES 1-17

The resin used was prepared according to Example X in U.S. Pat. No. 3,426,102. This graft copolymer of 75/25 acrylonitrile/methyl acrylate onto about 9 parts of a butadiene-acrylonitrile rubber was milled with each of the processing aids listed in the following table. These materials were then processed in a Brabender extrusion viscometer and the extruder output was monitored. Acceptable processing aids increased the extruder output and unacceptable processing aids were no better than or worse in extruder output than the control resin which had no processing aid added. The extrudates formed with the processing aids of this invention in the resin were all clear and colorless.

Table

| Example | Processing Aid | Parts (phr) | Brabender Output (120 rpm) (grams per minute) |
|---|---|---|---|
| 1 | control | 0 | 101.9 |
| 2 | stearic acid | 1.25 | 95.6 |
| 3 | methyl laurate | 1.25 | 91.4 |
| 4 | sebacic acid | 1 | 98.6 |
| 5 | dioctyl adipate | 1 | 92.6 |
| 6 | diethyl sebacate | 1 | 99.2 |
| 7 | calcium stearate | 1 | 92.6 |
| 8 | dibutyl sebacate | 0.1 | 105 |
| 9 | dibutyl sebacate | 0.3 | 105.8 |
| 10 | dibutyl sebacate | 0.5 | 109.2 |
| 11 | dibutyl sebacate | 1 | 104.8 |
| 12 | dibutyl sebacate | 2 | 106.7 |
| 13 | dibutyl sebacate | 3 | 98.8 |
| 14 | dibutyl phthalate | 1 | 106 |
| 15 | di-n-hexyl azelate | 1 | 107.2 |
| 16 | diallyl phthalate | 1 | 106.8 |
| 17 | diisopropyl phthalate | 1 | 105.7 |

I claim:

1. The processable composition comprising an intimate mixture of from about 0.05 to about 2 parts by weight of at least one processing aid selected from the group consisting of the propyl, butyl, amyl, and hexyl phthalates, adipates, azelates, and sebacates, and 100 parts by weight of a polymer resulting from the polymerization of 100 parts by weight of A. at least 50% by weight of at least one nitrile having the structure

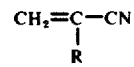

wherein R is hydrogen, a lower alkyl group having from 1 to 4 carbon atoms, or a halogen, and B. up to 50% by weight based on the combined weight of (A) and (B) of an ester having the structure

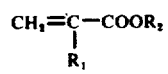

wherein $R_1$ is hydrogen, an alkyl group having from 1 to 4 carbon atoms, or a halogen, and $R_2$ is an alkyl group having from 1 to 6 carbon atoms in the presence of from 1 to 40 parts by weight of C. a polymer of at least 50% by weight of a conjugated diene monomer selected from the group consisting of butadiene and isoprene and up to 50% by weight of at least one member selected from the group consisting of styrene, an olefinically unsaturated nitrile having the structure

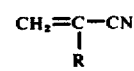

wherein R has the foregoing designation, and an ester having the structure

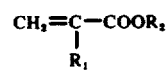

wherein $R_1$ and $R_2$ have the foregoing designations.

2. The composition of claim 1 wherein (A) is acrylonitrile.

3. The composition of claim 2 wherein (B) is methyl acrylate.

4. The composition of claim 3 wherein (C) is a copolymer of butadiene and acrylonitrile.

5. The composition of claim 4 wherein the processing aid is dibutyl sebacate.

6. The composition of claim 4 wherein the processing aid is dibutyl phthalate.

7. The composition of claim 4 wherein the processing aid is di-n-hexyl azelate.

8. The composition of claim 4 wherein the processing aid is diallyl phthalate.

9. The composition of claim 4 wherein the processing aid is diisopropyl phthalate.

* * * * *